a
3,280,199
PREPARATION OF PRIMARY ALCOHOLS
Louis Schmerling, Riverside, Ill., assignor to Universal Oil Products Company, Des Plaines, Ill., a corporation of Delaware
No Drawing. Filed Sept. 27, 1962, Ser. No. 226,734
20 Claims. (Cl. 260—617)

This invention relates to the preparation of primary alcohols. More particularly, this invention relates to the reduction of an alkali metal carboxylate, or an alkaline earth metal carboxylate, to form the corresponding primary alcohol.

Utilization of an aluminum-containing alkali metal hydride, such as lithium aluminum hydride, as a reducing agent is known to the art. The aluminum-containing alkali metal hydride is generally prepared by the reaction of an aluminum halide with an alkali metal hydride. It has now been discovered that the reduction of an alkali metal carboxylate, or an alkaline earth metal carboxylate, can be accomplished with an alkali metal hydride as the sole reducing agent to give a substantial yield of a primary alcohol.

It is therefore an object of this invention to present a novel process for the preparation of primary alcohols. It is a more specific object of this invention to present a novel reducing agent with respect to the alkali metal and alkaline earth metal carboxylates.

In one of its broad aspects this invention embodies a process for the preparation of a primary alcohol which comprises reacting an alkali metal hydride and a salt of a carboxylic acid at an elevated temperature, said salt being represented by the general formula

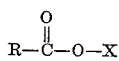

wherein X represents a metal selected from the group consisting of an alkali metal and an alkaline earth metal, and R is selected from the group consisting of alkyl, aralkyl, cycloalkyl, alkenyl, and cycloalkenyl.

Other objects and embodiments of the present invention will become apparent in the subsequent detailed specification thereof.

In accordance with the process of this invention an alkali metal hydride is reacted with an alkali metal or an alkaline earth metal carboxylate to yield a corresponding primary alcohol. The aforementioned alkali metal hydride relates to a hydride of sodium, potassium, lithium, rubidium, or cesium. The commercially available sodium hydride and lithium hydride are preferred although the remaining alkali metal hydrides are operable and are available as the reaction product of the molten alkali metal and hydrogen.

The selected alkali metal hydride is reacted with an alkali metal or an alkaline earth metal carboxylate. The alkali metal and the alkaline earth metal carboxylates include the sodium, potassium, lithium, rubidium, cesium, beryllium, magnesium, calcium, strontium, and barium carboxylates containing up to about 40 carbon atoms per molecule. Carboxylates, which may be reduced to the corresponding primary alcohol in accordance with the present process, include the alkali metal and the alkaline earth metal saturated carboxylates, for example, alkyl carboxylates such as sodium formate, potassium formate, lithium formate, rubidium formate, cesium formate, beryllium formate, magnesium formate, calcium formate, strontium formate, barium formate, as well as the alkali metal and alkaline earth metal acetates, propionates, butyrates, 3-methylbutyrates, pentanoates, 3-methylpentanoates, hexanoates, 3-methylhexanoates, heptanoates, 3-methylheptanoates, octanoates, nonanoates, decanoates, undecanoates, dodecanoates, tridecanoates, tetradecanoates, hexadecanoates, heptadecanoates, octadecanoates, etc., including the various structural isomers and higher alkyl homologs thereof containing up to about 40 carbon atoms per molecule as aforesaid. The secondary and tertiary alkyl carboxylates, containing respectively two and three alkyl substituents attached to the alpha carbon atom, for example, sodium 2-methylpropionate, potassium 2-methylpropionate, lithium 2-methylpropionate, rubidium 2-methylpropionate, cesium 2-methylpropionate, beryllium 2-methylpropionate, magnesium 2-methylpropionate, calcium 2-methylpropionate, strontium 2-methylpropionate, barium 2-methylpropionate, as well as the alkali metal and alkaline earth metal 2-methylbutyrates, 2-ethylbutyrates, 2-methylpentanoates, 2-ethylpentanoates, 2-propylpentanoates, 2-methylhexanoates, 2-ethylhexanoates, 2-propylhexanoates, 2-butylhexanoates, 2-methylheptanoates, 2-ethylheptanoates, 2-propylheptanoates, 2-butylheptanoates, 2-pentylheptanoates, 2,2-dimethylpropionates, 2,2-dimethylbutyrates, 2-methyl-2-ethylbutyrates, 2,2-dimethylpentanoates, 2-methyl-2-ethylpentanoates, 2,2-diethylpentanoates, 2-methyl-2-propylpentanoates, 2-ethyl-2-propylpentanoates, 2,2-dipropylpentanoates, 2,2-dimethylhexanoates, 2-methyl-2-ethylhexanoates, 2,2-diethylhexanoates, 2-methyl-2-propylhexanoates, 2-ethyl-2-propylhexanoates, 2,2-dipropylhexanoates, 2-methyl-2-butylhexanoates, 2-ethyl-2-butylhexanoates, etc., and also the higher homologs thereof, are particularly suitable alkyl carboxylates.

Suitable saturated carboxylates also include the alkali metal and the alkaline earth metal cycloalkylcarboxylates and cycloalkylalkylcarboxylates, for example, the sodium, potassium, lithium, cesium, rubidium, beryllium, magnesium, calcium, strontium, and barium cyclopropanecarboxylates, cyclobutanecarboxylates, cyclopentanecarboxylates, cyclohexanecarboxylates, cycloheptanecarboxylates, 3 - cyclopentylpropionates, 3 - cyclopentyl - 2- methylpropionates, 4-cyclopentylbutyrates, 4-cyclopentyl-2-methylbutyrates, 4-cyclopentyl-2-ethylbutyrates, 5-cyclopentylpentanoates, 5-cyclopentyl-2-methylpentanoates, 5 - cyclopentyl - 2 - ethylpentanoates, 6 - cyclopentylhexanoates, 6-cyclopentyl-2-methylhexanoates, 6-cyclopentyl-2-ethylhexanoates, 3-cyclohexylpropionates, 3-cyclohexyl-2-methylpropionates, 4-cyclohexylbutyrates, 4-cyclohexyl-2-methylbutyrates, 4-cyclohexyl-2-ethylbutyrates, 5-cyclohexylpentanoates, 5 - cyclohexyl - 2 - methylpentanoates, 5-cyclohexyl-2-ethylpentanoates, 6-cyclohexylhexanoates, 6-cyclohexyl-2-methylhexanoates, 6-cyclohexyl-2-ethylhexanoates, etc., and higher alkyl homologs thereof.

In addition the alkali metal or alkaline earth metal carboxylate can be an aralkylcarboxylate including for example, sodium phenylacetate, potassium phenylacetate, lithium phenylacetate, rubidium phenylacetate, cesium phenylacetate, beryllium phenylacetate, magnesium phenylacetate, calcium phenylacetate, strontium phenylacetate, barium phenylacetate, and the corresponding alkali metal and alkaline earth metal 2-phenylpropionates, 2-phenyl-2-methylpropionates, 2-phenyl-2-ethyl butyrates, 3-phenyl-2-methylpropionates, 3-phenyl - 2,2 - dimethylpropionates, 4-phenyl-2-methylbutyrates, 4-phenyl-2,2-dimethylbutyrates, 5-phenyl-2-methylpentanoates, 5-phenyl-2,2-dimethylpentanoates, 6 - phenyl-2-methylhexanoates, 6-phenyl-2,2-dimethylhexanoates, etc., and higher alkyl and aryl homologs thereof containing up to about 40 carbon atoms per molecule. The process of this invention further includes the reduction of the alkali metal and alkaline earth metal alkenyl carboxylates, for example, sodium propenoate (i.e., sodium acrylate), potassium propenoate, lithium propenoate, rubidium propenoate, cesium propenoate, beryllium propenoate, magnesium propenoate, calcium propenoate, strontium propenoate, barium propenoate, and the corresponding alkali metal and alkaline earth metal 2-methylpropenoates, 2-butenoates, 3-butenoates, 2-methyl-2-butenoates, 2-pentenoates, 3-pentenoates, 2-methyl-2-pentenoates, 2-hexenoates, 9-octadecenoates, 9,12-octadecadienoates, etc., and also the cycloalkene carboxylates including sodium 1-cyclopentene carboxylate, sodium 2-(2-cyclopentene)-acetate, sodium 3-(2-cyclopentene)-propionate, sodium 2-cyclopentenecarboxylate, sodium 3-cyclopentenecarboxylate, sodium 1-cyclohexenecarboxylate, sodium 2-cyclohexenecarboxylate, sodium 2-(2-cyclohexene)-acetate, sodium 3-(2-cyclohexene)-propionate, sodium 3-cyclohexenecarboxylate, etc., and the corresponding potassium, lithium, rubidium, cesium, beryllium, magnesium, calcium, strontium, and barium cycloalkene carboxylates.

While the present process offers a means for the preparation of primary alcohols from a large variety of salts as indicated by the above, the best results are in general obtained with salts of acids in which the carbon atom adjacent to the carboxyl group is substituted by one or two hydrocarbon groups; i.e., the salt is a sec-alkylcarboxylate or a tert-alkylcarboxylate.

A preferred embodiment of this invention relates to a process for the preparation of 2-methylpentanol and comprises reacting lithium hydride and sodium 2-methylpentanoate at an elevated temperature.

Another preferred embodiment of this invention is in a process for the preparation of 2,2-dimethyl-1-pentanol which comprises reacting lithium hydride and sodium 2,2-dimethylpentanoate at an elevated temperature.

Still another preferred embodiment concerns a process for the preparation of cyclohexylcarbinol and comprises reacting lithium hydride and sodium cyclohexylcarboxylate at an elevated temperature.

Yet another preferred embodiment is in a process for the preparation of 2-ethyl-4-cyclopentylbutanol which comprises reacting lithium hydride and potassium 2-ethyl-4-cyclopentylbutyrate at an elevated temperature.

Pressure does not appear to be an important variable with respect to the process of this invention and may be simply autogenous pressure developed during the course of the reaction, and/or an imposed pressure of dry nitrogen, or other inert gas, to maintain an inert dry reaction atmosphere. Generally speaking, the reaction between the alkali metal hydride and the alkali metal or alkaline earth metal carboxylate is effected at an elevated temperature of from about 100° C. to about 300° C. However, the reaction is preferably effected within a more restricted temperature range of from about 150° C. to about 250° C. Stoichiometrically, the reduction of the selected carboxylate requires 2 moles of the alkali metal hydride per mole of alkali metal carboxylate, and 4 moles per mole of alkaline earth metal carboxylate. However, it is preferred to operate with a molar excess of the alkali metal hydride as a deterrent to undesirable side reactions. Accordingly, at least about a 0.5 to 1.0 molar excess of the alkali metal hydride is generally preferred.

The process of the present invention may be effected in any conventional or otherwise convenient manner. For example, a batch type of operation may be employed wherein a quantity of the starting materials comprising the alkali metal hydride and the selected carboxylate, is placed in a reaction vessel provided with heating and mixing means, and, in the case of an open vessel, an overhead condenser. It is highly desirable to displace the moisture from the atmosphere, for example, by flushing the reaction vessel with dry nitrogen and, in the case of an open vessel, maintaining a continuous purge during the course of the reaction or, in the case of a closed autoclave, maintaining an imposed pressure of nitrogen during the course of the reaction. The reaction mixture is heated at the desired temperature over a predetermined reaction period. At the expiration of this period, the reaction vessel contents are cooled to about room temperature and hydrolyzed. The desired primary alcohol is recovered from the hydrolyzed reaction mixture, for example, as an ether extract thereof or by distillation with steam.

Examples of primary alcohol reaction products which are prepared according to the process of the present invention include butanol,
2-methylbutanol,
3-methylbutanol,
pentanol,
2-methylpentanol,
3-methylpentanol,
4-methylpentanol,
hexanol,
2-methylhexanol,
3-methylhexanol,
4-methylhexanol,
5-methylhexanol,
2-ethylhexanol,
3-ethylhexanol,
4-ethylhexanol,
heptanol,
2-methylheptanol,
3-methylheptanol,
octanol,
nonanol,
decanol,
undecanol,
dodecanol,
tridecanol,
tetradecanol,
hexadecanol,
heptadecanol,
octadecanol,
2-methylpropanol,
2-methylbutanol,
2-ethylbutanol,
2-methylpentanol,
2-ethylpentanol,
2-propylpentanol,
2-methylhexanol,
2-ethylhexanol,
2-propylhexanol,
2-butylhexanol,
2-methylheptanol,
2-ethylheptanol,
2-propylheptanol,
2-butylheptanol,
2-pentylheptanol,
2,2-dimethylpropanol,
2,2-dimethylbutanol,
2-methyl-2-ethylbutanol,
2,2-dimethylpentanol,
2-methyl-2-ethylpentanol,
2,2-diethylpentanol,
2-methyl-2-propylpentanol,
2-ethyl-2-propylpentanol,
2,2-dipropylpentanol,
2,2-dimethylhexanol,
2-methyl-2-ethylhexanol,
2,2-diethylhexanol,
2-methyl-2-propylhexanol,
2-ethyl-2propylhexanol,
2,2-dipropylhexanol,
2-methyl-2-butylhexanol,
2-ethyl-2-butylhexanol,
cyclopropylcarbinol,
cyclobutylcarbinol,
cyclopentylcarbinol,
cyclohexylcarbinol,
cycloheptylcarbinol,
3-cyclopentylpropanol, 3-cyclopentyl-2-methylpropanol,
4-cyclopentylbutanol,
4-cyclopentyl-2-methylbutanol,
4-cyclopentyl-2-ethylbutanol,
5-cyclopentylpentanol,
5-cyclopentyl-2-methylpentanol,
5-cyclopentyl-2-ethylpentanol,
6-cyclopentylhexanol,
6-cyclopentyl-2-methylhexanol,
6-cyclopentyl-2-ethylhexanol,
3-cyclohexylpropanol,
3-cyclohexyl-2-methylpropanol,
4-cyclohexylbutanol,
4-cyclohexyl-2-methylbutanol,
4-cyclohexyl-2-ethylbutanol,
5-cyclohexylpentanol,
5-cyclohexyl-2-methylpentanol,
5-cyclohexyl-2-ethylpentanol,
6-cyclohexylhexanol,
6-cyclohexyl-2-methylhexanol,
6-cyclohexyl-2-ethylhexanol,
2-phenyl-2-methylethanol,
2-phenyl-2,2-dimethylethanol,
2-phenyl-2,2-diethylethanol,
3-phenyl-2-methylpropanol,
3-phenyl-2,2-dimethylpropanol,
4-phenyl-2-methylbutanol,
4-phenyl-2,2-dimethylbutanol,
5-phenyl-2-methylpentanol,
5-phenyl-2,2-dimethylpentanol,
6-phenyl-2-methylhexanol,
6-phenyl-2,2-dimethylhexanol,
propenol,
2-methylpropenol,
2-butenol,
3-butenol,
2-methyl-2-butenol,
2-pentenol,
3-pentenol,
2-methyl-2-pentenol 2-hexenol,
9-octadecenol,
9,12-octadecadienol,
1-cyclopentenylcarbinol,
2-(2-cyclopentene)-ethanol,
3-(2-cyclopentene)-propanol,
2-cyclopentenecarbinol,
3-cyclopenetenecarbinol,
1-cyclohexenecarbinol,
2-cyclohexenecarbinol,
2-(2-cyclohexene)-ethanol,
3-(2-cyclohexene)-propanol,
3-cyclohexenecarbinol, etc.

It is to be understood that the above-mentioned compounds are only representative of the class of primary alcohols herein disclosed and are not intended to limit the generally broad scope of the present invention accordance with therewith.

The process of this invention is further illustrated by the following examples:

Example I

A mixture of about 0.33 mole of sodium cyclohexylcarboxylate and 3.5 moles of lithium hydride was charged to a glass liner which was inserted in an 850 cc. autoclave. The autoclave was flushed with dry nitrogen, sealed, and thereafter pressured to about 30 atmospheres with nitrogen. The autoclave was rotated and heated at a temperature of 150–250° C. over a 5 hour period. At the expiration of this period the autoclave was cooled to about room temperature and vented to the atmosphere. A granular solid (79 grams) was recovered from the glass liner and hydrolyzed with ice water. The resulting material was extracted with ether, dried over potassium carbonate, and distilled to yield 4 grams of product boiling at 178–179° C., identified as cyclohexylcarbinol by nuclear magnetic resonance methods.

Example II

A mixture of about 0.22 mole of sodium 2-methylpentanoate and 0.76 mole of lithium hydride was charged to a glass liner which was inserted in an 850 cc. autoclave. The autoclave was flushed with dry nitrogen, sealed, and thereafter pressured to about 30 atmospheres with nitrogen. The autoclave was rotated and heated at a temperature of 150–250° C. over approximately a 6 hour period. The autoclave was thereafter cooled to about room temperature and vented to the atmosphere. The reaction mixture was hydrolyzed with water and ether extracted. Distillation of the dried ether extract yielded 15 grams (67% of the theoretical yield) of 2-methyl-1-pentanol boiling at 146–147° C.

Example III

About 0.1 mole of sodium octadecanoate (sodium stearate) and 0.6 mole of sodium hydride were charged to a glass liner inserted in an 850 cc. autoclave. The autoclave was flushed with dry nitrogen, sealed, and thereafter pressured to about 30 atmospheres with nitrogen. The autoclave was rotated and heated at a temperature of 150–250° C. for a period of about 6 hours. At the end of this period the autoclave was cooled to about room temperature and depressured. The autoclave contents were hydrolyzed with water, ether extracted, and dried. Distillation of the ether extract yielded 11 grams of material identified by nuclear magnetic resonance methods as n-octadecanol mixed with octadecane.

Example IV 2,2-diethyl-1-pentanol is prepared by heating about 0.3 mole of sodium, 2,2-dimethylpentanoate together with about 1.5–2.0 mole of lithium hydride contained in a glass lined autoclave flushed and pressured with dry nitrogen. The autoclave contents are subjected to continuous mixing and heated at a temperature of 150-250° C. for about a 6 hour period. The reaction mixture is thereafter cooled to about room temperature and hydrolyzed with water. The 2,2-diethyl-1-pentanol is recovered by ether extraction of the hydrolyzed reaction mixture followed by drying and distillation.

Example V

In the preparation of 2-ethyl-4-cyclopentylbutanol, about 0.2 mole of potassium 2-ethyl-4-cyclopentylbutanoate and 1.0 mole of lithium hydride are charged to an autoclave and sealed therein in an atmosphere of dry nitrogen. The autoclave contents are subjected to continuous mixing at a temperature of about 150–250° C. for a period of about 6 hours. The reaction mixture is thereafter cooled to about room temperature and hydrolyzed with water. The 2-ethyl-4-cyclopentylbutanol is recovered by ether extraction of the hydrolyzed reaction mixture followed by drying and distillation.

Example VI

In the preparation of isobutyl alcohol (2-methylpropanol), about 3 moles of calcium 2-methyl-propionate and 25 moles of lithium hydride are charged to an autoclave and sealed therein in a dry nitrogen atmosphere. The autoclave contents are subjected to continuous mixing at a temperature of about 150–250° C. for a period of about 12 hours. The reaction mixture is thereafter cooled to about room temperature and hydrolyzed with water. The isobutyl alcohol is recovered by ether extraction of the hydrolyzed reaction mixture followed by drying and distillation.

Example VII

When 0.2 mole of sodium 2,2-diethylhexanoate, formed by the condensation of sodium 2-ethylhexanoate and ethylene in the presence of an alkali metal catalyst, is treated with 1 mole lithium hydride at 150–250° C. and the product worked up as described in the preceding examples, there is obtained 0.06 mole of 2,2-diethyl-1-hexanol boiling at 180–181° C.

I claim as my invention:

1. A process for the preparation of a primary alcohol which comprises reacting an alkali metal hydride and a salt of a carboxylic acid containing up to about 40 carbon atoms per molecule at an elevated temperature said hydride being present in a stoichiometric excess over the salt and, said salt being represented by the general formula of from about 100° C. to about 300° C.

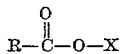

wherein X represents a metal selected from the group consisting of an alkali metal and an alkaline earth metal, and R is selected from the group consisting of alkyl, aralkyl, alkenyl, cycloalkyl, and cycloalkenyl, and hydrolyzing the resultant reaction product.

2. A process for the preparation of a primary alcohol which comprises reacting an alkali metal hydride and a saturated alkylcarboxylate containing up to about 40 carbon atoms per molecule at an elevated temperature of from about 100° C. to about 300° C., said carboxylate being selected from the group consisting of an alkali metal and an alkaline earth metal saturated carboxylate and said hydride being present in stoichiometric excess over the carboxylate, and hydrolyzing the resultant reaction product.

3. A process for the preparation of a primary alcohol which comprises reacting an alkali metal hydride and an alkylcarboxylate containing up to about 40 carbon atoms per molecule at an elevated temperature of from about 100° C. to about 300° C., said carboxylate being selected from the group consisting of an alkali metal and an alkaline earth metal alkylcarboxylate and said hydride being present in stoichiometric excess over the carboxylate, and hydrolyzing the resultant reaction product.

4. A process for the preparation of a primary alcohol which comprises reacting an alkali metal hydride and a cycloalkylcarboxylate containing up to about 40 carbon atoms per molecule at an elevated temperature of from about 100° C. to about 300° C., said carboxylate being selected from the group consisting of an alkali metal and an alkaline earth metal cycloalkylcarboxylate and said hydride being present in stoichiometric excess over the carboxylate, and hydrolyzing the resultant reaction product.

5. A process for the preparation of a primary alcohol which comprises reacting sodium hydride and an alkali metal saturated carboxylate containing up to about 40 carbon atoms per molecule at a temperature of from about 100° C. to about 300° C., said hydride being present in stoichiometric excess over the carboxylate, and hydrolyzing the resultant reaction product.

6. A process for the preparation of a primary alcohol which comprises reacting sodium hydride and an alkali metal alkylcarboxylate containing up to about 40 carbon atoms per molecule at a temperature of from about 100° C. to about 300° C., said hydride being present in stoichiometric excess over the carboxylate, and hydrolyzing the resultant reaction product.

7. A process for the prepartion of a primary alcohol which comprises reacting sodium hydride and an alkali metal primary-alkylcarboxylate containing up to about 40 carbon atoms per molecule at a temperature of from about 100° C. to about 300° C., said hydride being present in stoichiometric excess over the carboxylate, and hydrolyzing the resultant reaction product.

8. A process for the preparation of a primary alcohol which comprises reacting sodium hydride and an alkali metal sec-alkylcarboxylate containing up to about 40 carbon atoms per molecule at a temperature of from about 100° C. to about 300° C., said hydride being present in stoichiometric excess over the carboxylate, and hydrolyzing the resultant reaction product.

9. A process for the preparation of a primary alcohol which comprises reacting sodium hydride and an alkali metal tert-alkylcarboxylate containing up to about 40 carbon atoms per molecule at a temperature of from 100° C. to about 300° C., said hydride being present in stoichiometric excess over the carboxylate, and hydrolyzing the resultant reaction product.

10. A process for the preparation of a primary alcohol which comprises reacting sodium hydride and an alkali metal cycloalkylcarboxylate containing up to about 40 carbon atoms per molecule at a temperature of from about 100° C. to about 300° C., said hydride being present in stoichiometric excess over the carboxylate, and hydrolyzing the resultant reaction product.

11. A process for the preparation of a primary alcohol which comprises reacting lithium hydride and an alkali metal saturated carboxylate containing up to about 40 carbon atoms per molecule at a temperature of from about 100° C. to about 300° C., said hydride being present in stoichiometric excess over the carboxylate, and hydrolyzing the resultant reaction product.

12. A process for the preparation of a primary alcohol which comprises reacting lithium hydride and an alkali metal alkylcarboxylate containing up to about 40 carbon atoms per molecule at a temperature of from about 100° C. to about 300° C., said hydride being present in stoichiometric excess over the carboxylate, and hydrolyzing the resultant reaction product.

13. A process for the preparation of a primary alcohol which comprises reacting lithium hydride and an alkali metal sec-alkylcarboxylate containing up to about 40 carbon atoms per molecule at a temperature of from 100° C. to about 300° C., said hydride being present in stoichiometric excess over the carboxylate, and hydrolyzing the resultant reaction product.

14. A process for the preparation of a primary alcohol which comprises reacting lithium hydride and an alkali metal tert-alkylcarboxylate containing up to about 40 carbon atoms per molecule at a temperature of from about 100° C. to about 300° C., said hydride being present in stoichiometric excess over the carboxylate, and hydrolyzing the resultant reaction product.

15. A process for the preparation of a primary alcohol which comprises reacting lithium hydride and an alkali metal cycloalkylcarboxylate containing up to about 40 carbon atoms per molecule at a temperature of from about 100° C. to about 300° C., said hydride being present in stoichiometric excess over the carboxylate, and hydrolyzing the resultant reaction product.

16. A process for the preparation of n-octadecanol which comprises reacting sodium hydride and sodium octadecanoate at a temperature of from about 150° C. to about 250° C., the first-mentioned reactant being present in stoichiometric excess over the second-mentioned reactant, and hydrolyzing the resultant reaction product.

17. A process for the preparation of 2-methyl-1-pentanol which comprises reacting lithium hydride and sodium 2-methylpentanoate at a temperature of from about 150° C. to about 250° C., the first-mentioned reactant being present in stoichiometric excess over the second-mentioned reactant, and hydrolyzing and resultant reaction product.

18. A process for the preparation of 2,2-diethyl-1-pentanol which comprises reacting lithium hydride and sodium 2,2-dimethylpentanoate at a temperature of from about 150° C. to about 250° C., the first-mentioned reactant being present in stoichiometric excess over the second-mentioned reactant, and hydrolyzing the resultant reaction product.

19. A process for the preparation of cyclohexylcarbinol which comprises reacting lithium hydride and sodium cyclohexylcarboxylate at a temperature of from about 150° C. to about 250° C., the first-mentioned reactant being present in stoichiometric excess over the second-mentioned reactant, and hydrolyzing the resultant reaction product.

20. A process for the preparation of 2-ethyl-4-cyclopentylbutanol which comprises reacting lithium hydride and potassium 2-ethyl-4-cyclopentylbutyrate at a temperature of from about 150° C. to about 250° C., the first-mentioned reactant being present in stoichiometric excess over the second-mentioned reactant, and hydrolyzing the resultant reaction product.

References Cited by the Examiner

UNITED STATES PATENTS 2,576,103  11/1951  Cawley et al. _____ 260—617

FOREIGN PATENTS 803,178  7/1956  Great Britain.

LEON ZITVER, *Primary Examiner.*

HAROLD G. MOORE, *Examiner.*

M. B. ROBERTO, T. G. DILLAHUNTY,
*Assistant Examiners.*